United States Patent
Kudoh

(10) Patent No.: US 8,896,710 B2
(45) Date of Patent: Nov. 25, 2014

(54) ZOOM LENS BARREL AND IMAGE PICKUP APPARATUS HAVING THE SAME

(75) Inventor: Tomoyuki Kudoh, Tokyo (JP)

(73) Assignee: Canon Kabushiki Kaisha (JP)

( * ) Notice: Subject to any disclaimer, the term of this patent is extended or adjusted under 35 U.S.C. 154(b) by 159 days.

(21) Appl. No.: 13/595,021

(22) Filed: Aug. 27, 2012

(65) Prior Publication Data
US 2013/0050563 A1 Feb. 28, 2013

(30) Foreign Application Priority Data
Aug. 29, 2011 (JP) .................................. 2011-185974

(51) Int. Cl.
  *H04N 5/228* (2006.01)
  *H04N 5/262* (2006.01)
  *G03B 17/00* (2006.01)
  *G03B 5/00* (2006.01)
  *G02B 27/64* (2006.01)
  *G03B 17/04* (2006.01)

(52) U.S. Cl.
  CPC .............. *G02B 27/646* (2013.01); *G03B 17/04* (2013.01); *G03B 5/00* (2013.01); *G03B 2205/0015* (2013.01)
  USPC ................... 348/208.11; 348/240.3; 348/335; 396/55; 396/348

(58) Field of Classification Search
  CPC .. H04N 5/232; H04N 5/2238; H04N 5/23287
  USPC ............ 348/208.11, 240.3, 335; 396/55, 348, 396/349
  See application file for complete search history.

(56) References Cited

U.S. PATENT DOCUMENTS

| | | | | |
|---|---|---|---|---|
| 5,416,558 | A * | 5/1995 | Katayama et al. | 348/208.11 |
| 5,913,081 | A * | 6/1999 | Okano et al. | 348/208.11 |
| 6,978,089 | B2 * | 12/2005 | Nomura et al. | 396/349 |
| 7,515,182 | B2 * | 4/2009 | Omiya et al. | 348/240.99 |
| 7,684,685 | B2 * | 3/2010 | Takahashi | 348/208.11 |
| 2007/0009243 | A1 * | 1/2007 | Takahashi | 396/55 |
| 2007/0285522 | A1 * | 12/2007 | Kimura | 348/208.99 |
| 2010/0165488 | A1 | 7/2010 | Ishimasa | |
| 2010/0183288 | A1 | 7/2010 | Kudoh | |
| 2011/0141566 | A1 * | 6/2011 | Suzuka | 359/557 |

FOREIGN PATENT DOCUMENTS

JP    10-111444 A    4/1998
JP    2004-053633 A    2/2004

OTHER PUBLICATIONS

Chinese Office Action issued in Chinese counterpart application No. CN201210311255.0, dated Jun. 4, 2014. English translation provided.

* cited by examiner

*Primary Examiner* — Nhan T Tran
(74) *Attorney, Agent, or Firm* — Rossi, Kimms & McDowell LLP

(57) ABSTRACT

A zoom lens barrel capable, even if it has an image shake correction mechanism and a diaphragm mechanism, of decreasing a distance between lens groups of a photographing optical system of the lens barrel, whereby the lens barrel size can be reduced and the magnification can be increased, and capable of preventing a collision between diaphragm blades of the diaphragm mechanism and the lens groups from occurring when vibration, impact, or the like is applied to the lens barrel. When apart of an image shake correction lens intrudes into an aperture of diaphragm blades, a restricted portion of a lens holding member and a restricting portion of a diaphragm restrict a maximum movement of the lens holding member in a direction perpendicular to the optical axis, thereby restricting a maximum amount of movement of the image shake correction lens in the direction perpendicular to the optical axis.

16 Claims, 7 Drawing Sheets

ZOOM LENS BARREL AND IMAGE PICKUP APPARATUS HAVING THE SAME

BACKGROUND OF THE INVENTION

1. Field of the Invention

The present invention relates to a zoom lens barrel and an image pickup apparatus provided with the lens barrel.

2. Description of the Related Art

An image pickup apparatus such as a digital camera mounted with a zoom lens barrel has been demanded to have a high photographing magnification and a thin thickness. This poses a problem that a movement stroke of a photographing lens group must be increased while reducing the lens barrel size.

Nevertheless, there has widely been used a camera that has a lens barrel provided with an iris diaphragm for changing the amount of incident light to cope with various photographing conditions. In such a camera, a movement of a photographing lens group is restricted by the iris diaphragm provided in the lens barrel.

In a case, for example, that the iris diaphragm is disposed between photographing lens groups, these lens groups cannot relatively be moved toward each other much closer than the thickness of the iris diaphragm. In another case that one of photographing lens groups includes an image shake correction lens that is movable in a direction perpendicular to an optical axis, the photographing lens groups must be disposed taking account of a maximum amount of movement of the image shake correction lens.

Conventionally, there has been proposed an image pickup apparatus having a lens barrel in which a diaphragm is provided on a portion of an object-side lens surface of a lens (lens group) (see, Japanese Laid-open Patent Publication No. 2004-053633).

However, the diaphragm of the proposed image pickup apparatus has an aperture of a fixed diameter, and accordingly, if a target F number in design is determined at one of wide-angle and telephoto ends, an F number at another of the wide-angle and telephoto ends is determined by a focal distance. Thus, if an attempt is made to increase the diaphragm aperture diameter at the wide-angle end, the diaphragm aperture diameter at the telephoto end also increases. To obviate this, the number of lenses must be increased, so that the lens barrel size cannot be reduced.

There has also been proposed a lens barrel frame that includes a lens having a convex spherical portion (Japanese Laid-open Patent Publication No. H10-111444).

However, in a case that an image shake correction lens movable in a direction perpendicular to the optical axis is used in the proposed lens barrel frame, interference can occur between the image shake correction lens and diaphragm blades when vibration, impact, or the like is applied to the lens barrel frame in a state that the convex spherical portion of the lens intrudes into an aperture of the diaphragm blades, resulting in a fear that the image shake correction lens and/or the diaphragm blades are damaged. It is therefore difficult to apply the construction disclosed in Japanese Laid-open Patent Publication No. H10-111444 to a lens barrel provided with an image shake correction lens.

SUMMARY OF THE INVENTION

The present invention provides a zoom lens barrel and an image pickup apparatus having the same that are capable, even if the lens barrel has an image shake correction mechanism and a diaphragm mechanism, of decreasing a distance between lens groups of a photographing optical system of the lens barrel, whereby the lens barrel size can be reduced and the photographing magnification can be increased, and capable of preventing a collision between diaphragm blades of the diaphragm mechanism and the lens groups from occurring when vibration, impact, or the like is applied to the lens barrel.

According to one aspect of this invention, there is provided a zoom lens barrel having a photographing optical system movable between photographing positions and a retracted position in a direction of an optical axis, which comprises an image shake correction mechanism having an image shake correction lens that constitutes a part of the photographing optical system and having a lens holding member that is configured to hold the image shake correction lens and movable in a direction perpendicular to the optical axis, and a restriction unit configured to restrict a maximum amount of movement of the lens holding member in the direction perpendicular to the optical axis to thereby restrict a maximum amount of movement of the image shake correction lens in the direction perpendicular to the optical axis.

According to this invention, even if the lens barrel has an image shake correction mechanism and a diaphragm mechanism, a distance between lens groups of the photographing optical system of the lens barrel can be decreased, whereby the lens barrel size can be reduced and the photographing magnification can be increased. Furthermore, a collision between the diaphragm blades of the diaphragm mechanism and the lens groups can be prevented from occurring when vibration, impact, or the like is applied to the lens barrel.

Further features of the present invention will become apparent from the following description of an exemplary embodiment with reference to the attached drawings.

DESCRIPTION OF THE EMBODIMENTS

The present invention will now be described in detail below with reference to the drawings showing a preferred embodiment thereof.

Figure 1A:
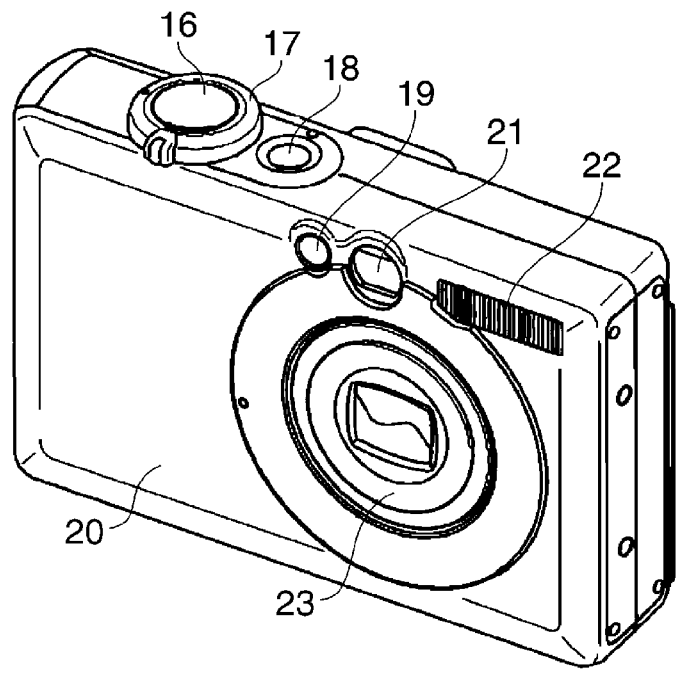
FIG. 1A is an external front perspective view of a digital camera, which is an example of an image pickup apparatus according to one embodiment of this invention.
Figure 1B:
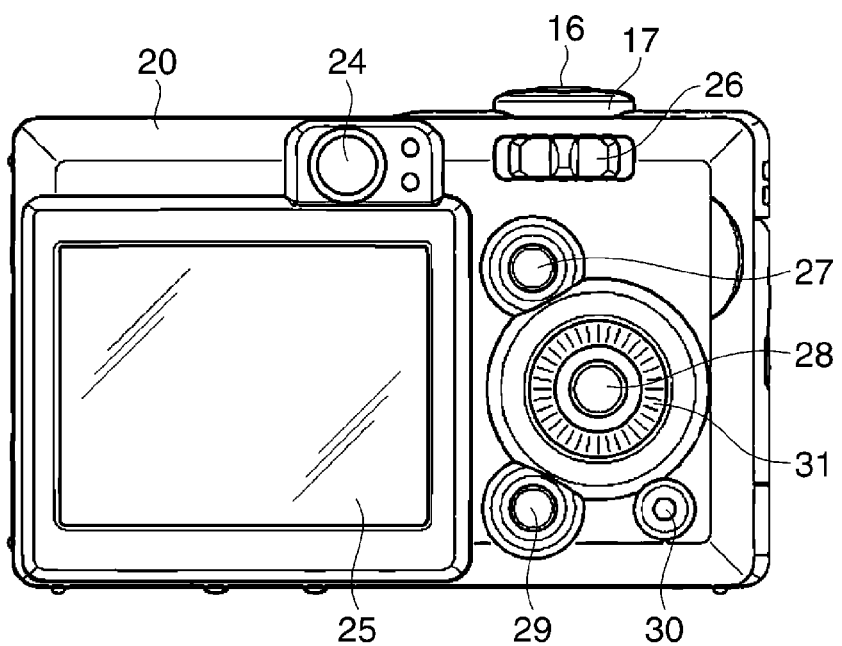
FIG. 1B is a rear view of the digital camera.

FIGS. 1A and 1B show a digital camera in external front perspective view and in rear view, respectively, where the digital camera is an example of an image pickup apparatus according to one embodiment of this invention.

As shown in FIG. 1A, the digital camera 20 of this embodiment has its front surface on which there are disposed an auxiliary light source 19 for light and distance measurements, a finder 21 used to determine the composition of an object, a strobe 22, and a lens barrel 23. The lens barrel 23 is a zoom lens barrel that has a photographing optical system movable between photographing positions (telephoto and wide-angle positions and intermediate positions therebetween in this example) and a retracted position in a direction of an optical axis and capable of changing the photographing magnification.

On an upper surface of the digital camera 20, there are disposed a release button 16, a zoom switch 17, and a power switch button 18. As shown in FIG. 1B, a finder eyepiece 24, a display 25 such as an LCD, and operation buttons 26 to 31 are disposed on a rear surface of the digital camera 20.

Figure 2:
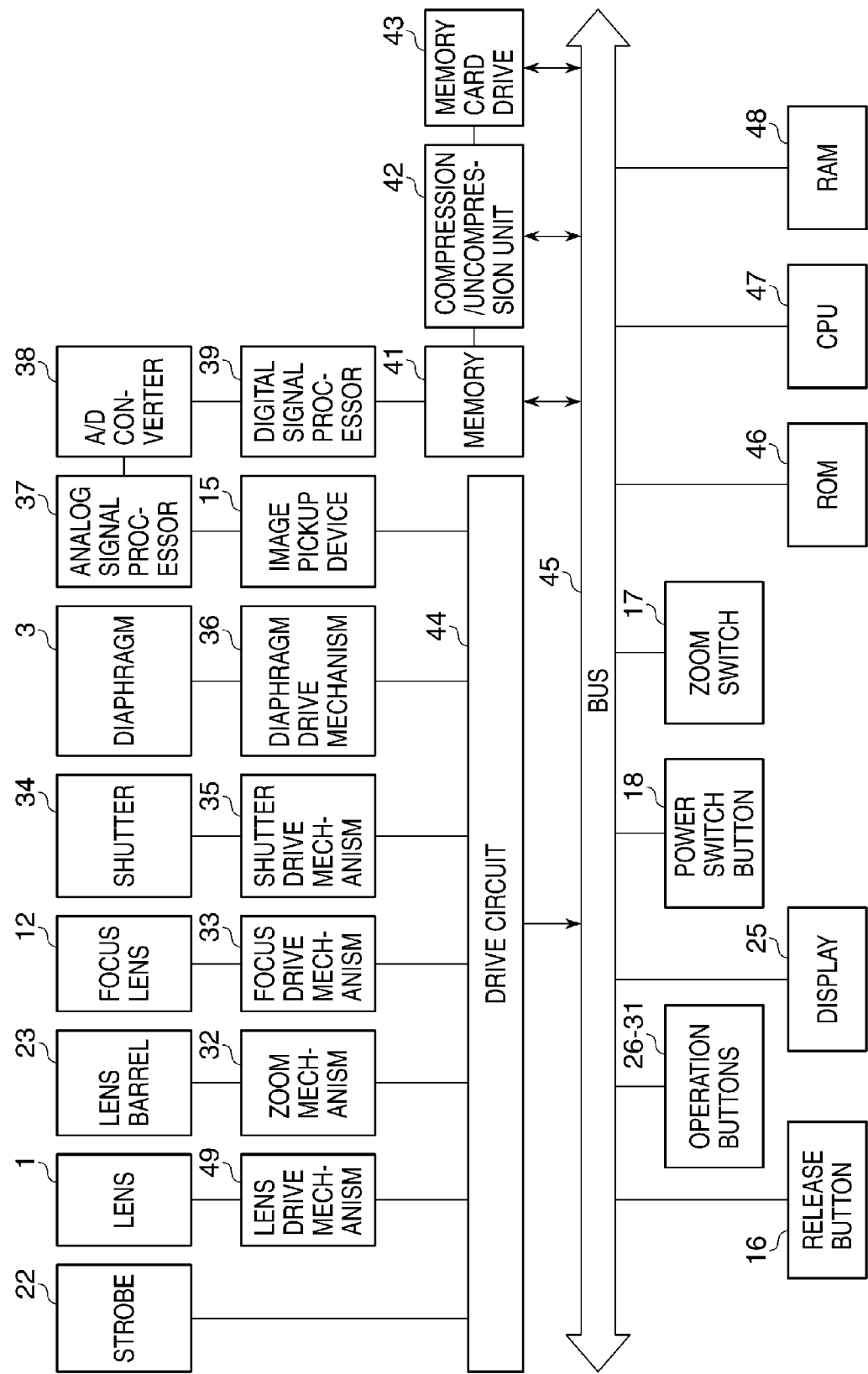
FIG. 2 is a block diagram showing a control system of the digital camera.

FIG. 2 shows in block diagram a control system of the digital camera 20.

The aforementioned release button 16, zoom switch 17, power switch button 18, display 25, and operation buttons 26 to 31 are connected to a bus 45. A memory 41, compression/uncompression unit 42, memory card drive 43, drive circuit 44, ROM 46, CPU 47, and RAM 48 are also connected to the bus 45.

Figure 3:
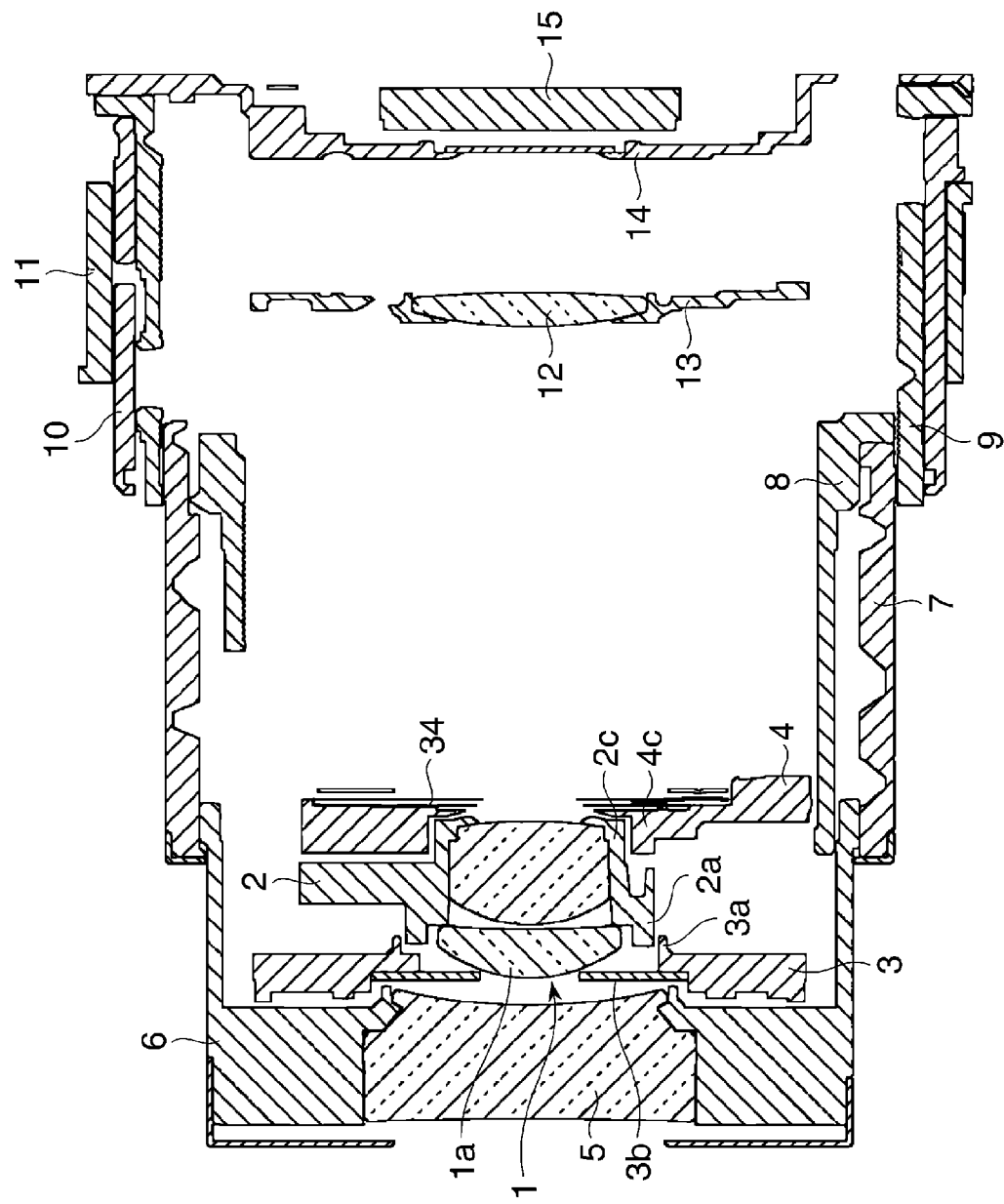
FIG. 3 is a section view of a lens barrel of the digital camera, where a photographing optical system of the lens barrel is positioned at a telephoto position.
Figure 4:
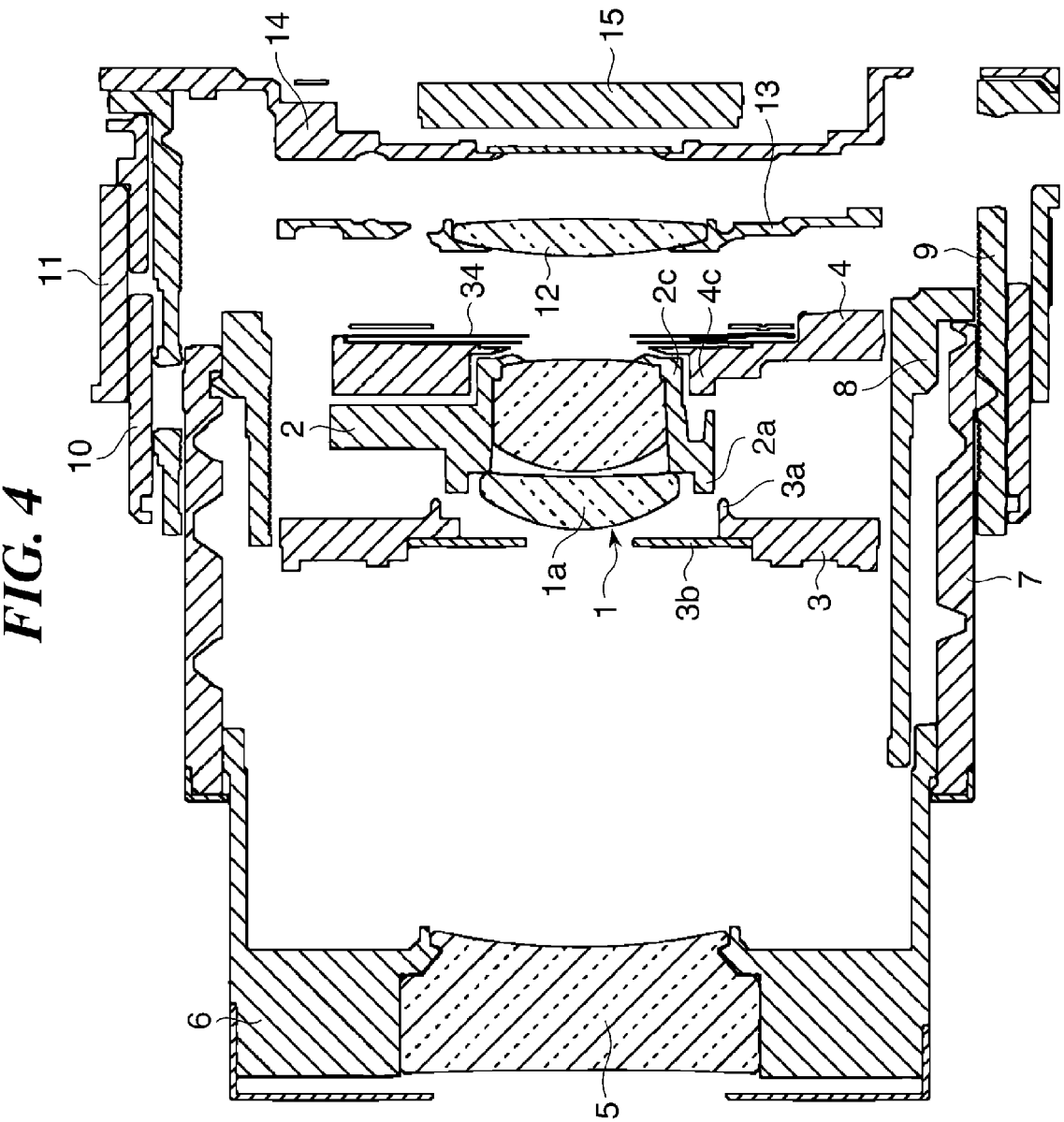
FIG. 4 is a section view of the lens barrel where the photographing optical system is positioned at a wide-angle position.
Figure 5:
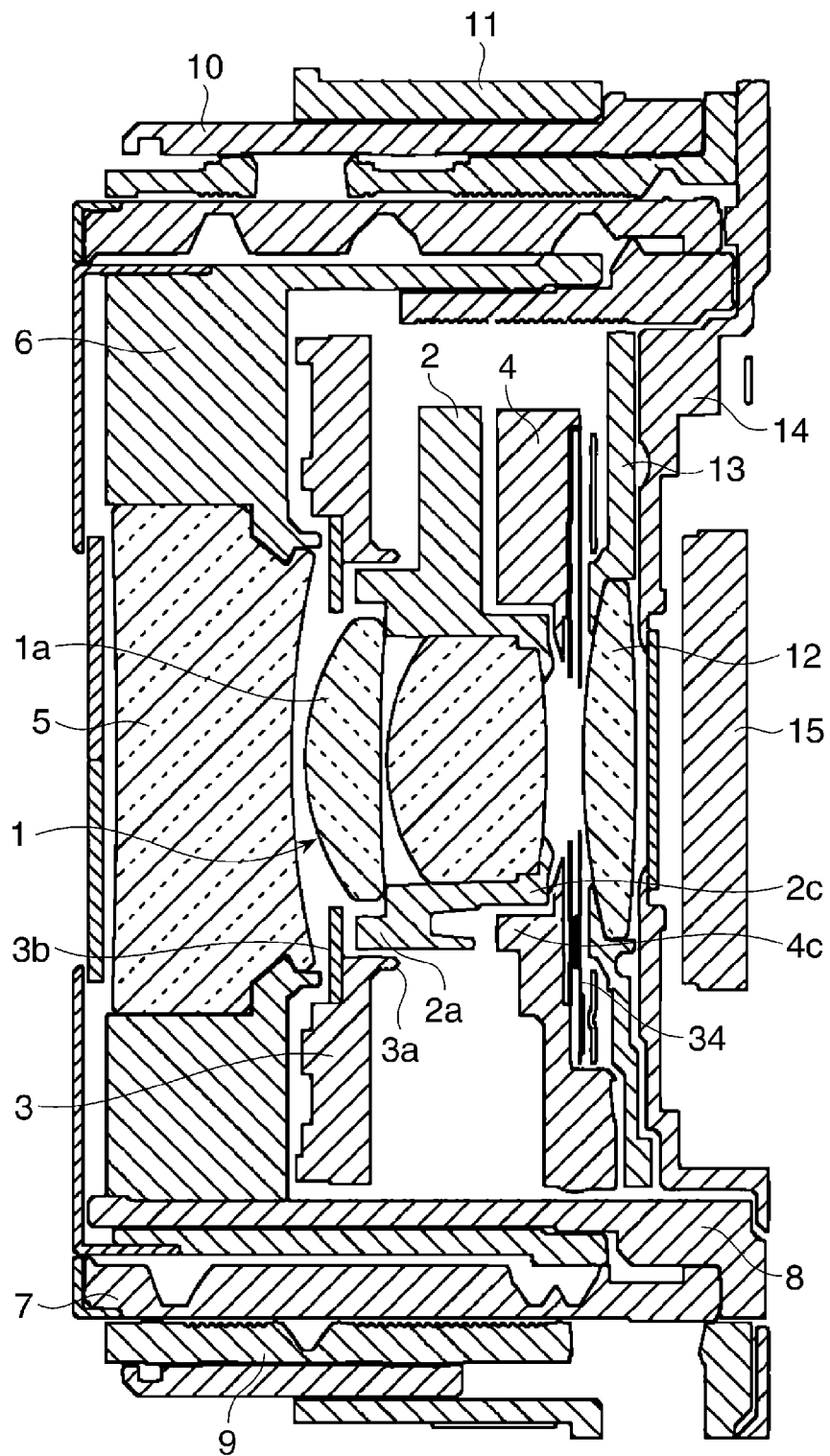
FIG. 5 is a section view of the lens barrel where the photographing optical system is positioned at a retracted position.

The drive circuit 44 is connected with a zoom mechanism 32 that zoom-drives the lens barrel 23, a focus drive mechanism 33 that drives a focus lens 12, a shutter drive mechanism 35 that drives a shutter 34, a diaphragm drive mechanism 36 that drives a diaphragm 3, and a correction lens drive mechanism 49 that drives an image shake correction lens. In this example, the correction lens drive mechanism 49 drives a second lens 1 (image shake correction lens) via a second lens holding member 2, which are shown in FIGS. 3 to 5.

An image pickup device 15 (such as a CCD sensor or a CMOS sensor) and the strobe 22 are also connected to the drive circuit 44. Under the control of the CPU 47, the drive circuit 44 controls the drives of respective parts of the camera that are connected to the drive circuit 44.

The ROM 46 stores a control program, etc., and the RAM 48 stores data required for execution of the control program. An analog signal processor 37 performs analog processing on image data output from the image pickup device 15 and outputs the processed image data to an A/D converter 38.

The A/D converter 38 converts the analog data received from the image pickup device 15 into digital data and outputs the digital data to a digital signal processor 39. The digital signal processor 39 performs predetermined processing on the digital data and outputs the processed data as image data to the memory 41.

The image data stored in the memory 41 is compressed by the compression/uncompression unit 42 into e.g. JPEG or TIFF data, which is then output to and stored into a memory card that is mounted to the memory card drive 43.

The image data stored in the memory 41 and the image data stored in the memory card can be uncompressed by the compression/uncompression unit 42, and the uncompressed image data can be displayed on the display 25. When image data displayed on the display 25 is viewed and determined by a user as being unnecessary to be retained for record purpose, the image data can be deleted by the user by operating the operation button 31.

Next, with reference to FIGS. 3 to 7, a description will be given of the lens barrel 23.

Figure 6:
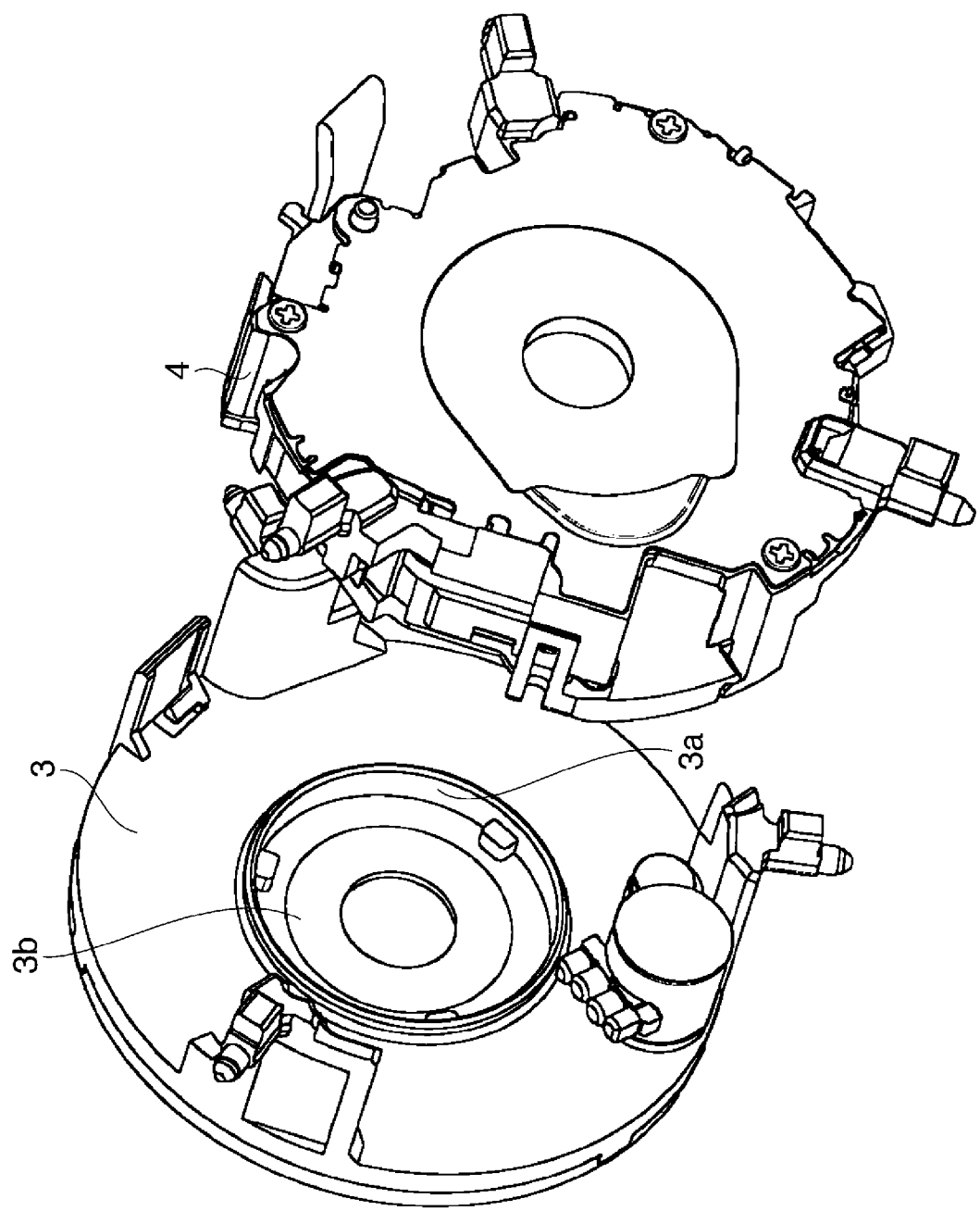
FIG. 6 is a perspective view of an iris diaphragm and an anti-vibration base plate of the lens barrel.
Figure 7:
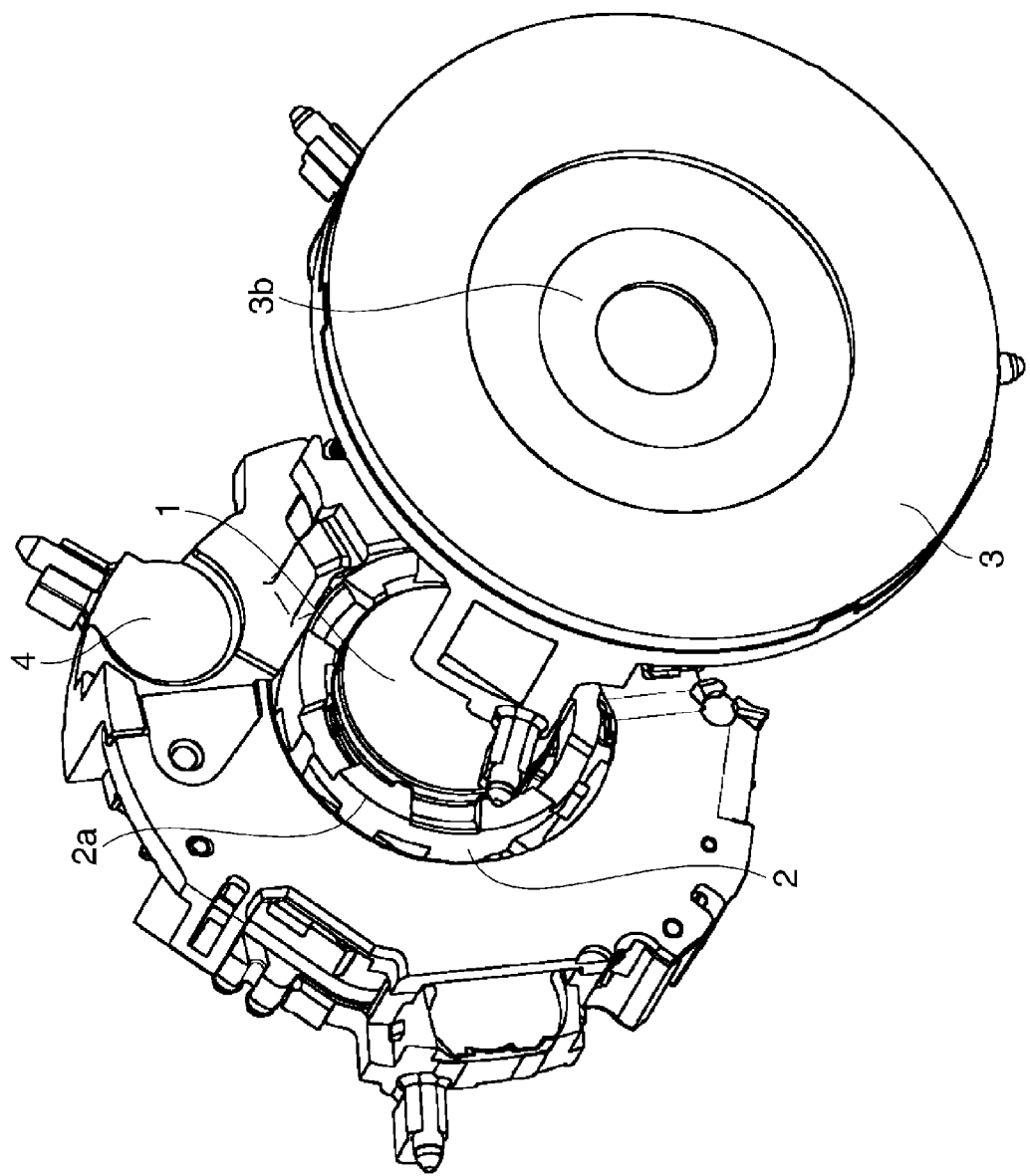
FIG. 7 is another perspective view of the iris diaphragm and the anti-vibration base plate.

FIGS. 3 to 5 show the lens barrel 23 in cross section where the photographing optical system is positioned at a TELE (telephoto) position, at a WIDE (wide-angle) position, and at a retracted position, respectively. FIGS. 6 and 7 each show the iris diaphragm 3 and an anti-vibration base plate 4 of the lens barrel 23 in perspective view.

As shown in FIGS. 3 to 5, the lens barrel 23 includes a first lens holding member 6 that holds a first lens 5, which is disposed on a side of the lens barrel closest to an object. The iris diaphragm 3 having diaphragm blades 3$b$ is disposed on an image surface side of the first lens holding member 6. In other words, the diaphragm 3 is disposed rearward of the lens holding member 6. A second lens holding member 2 that holds a second lens 1 is disposed on an image surface side of the iris diaphragm 3, and the anti-vibration base plate 4 is disposed on an image surface side of the second lens holding member 2. The second lens holding member 2 is movable relative to the first lens holding member 6 and relative to the anti-vibration base plate 4 in a direction perpendicular to the optical axis. The shutter 34 is mounted to an image surface side of the anti-vibration base plate 4.

The iris diaphragm 3 is an example of an iris diaphragm of this invention, which is provided in the photographing optical system. The iris diaphragm 3 and the diaphragm drive mechanism 36 (FIG. 2) constitute a diaphragm mechanism.

The second lens 1 is an example of an image shake correction lens of this invention that constitutes a part of the photographing optical system. The second lens 1, the second lens holding member 2, and the correction lens drive mechanism 49 (FIG. 2) constitute an image shake correction mechanism.

A first cam cylinder 7 is disposed on an outer peripheral side of the first lens holding member 6, and cam grooves are formed in an inner periphery of the first cam cylinder 7. A rectilinear guide cylinder 8 is disposed on an inner peripheral side of the first lens holding member 6 and bayonet-connected with the first cam cylinder 7.

A second cam cylinder 9 is disposed on an outer peripheral side of the first cam cylinder 7. A cam groove along which a follower of the first cam cylinder 7 moves is formed in an inner periphery of the second cam cylinder 9. An actuating cylinder 10 is disposed on an outer peripheral side of the second cam cylinder 9 and held at its outer periphery by a cover member 11.

When the actuating cylinder 10 is rotatably driven by the zoom mechanism 32, the first cam cylinder 7 rotates about the optical axis and moves in the optical axis direction with the rotation of the actuating cylinder 10, while the follower of the first cam cylinder 7 moves along the cam groove of the second cam cylinder 9.

The rectilinear guide cylinder 8 bayonet-connected with the first cam cylinder 7 moves in unison with the first cam cylinder 7 in the optical axis direction, while being prevented from rotating by engagement with a rectilinear groove formed in the inner periphery of the second cam cylinder 9.

The second lens holding member 2, the iris diaphragm 3, and the anti-vibration base plate 4 move in the optical axis direction along the cam grooves formed in the inner periphery of the first cam cylinder 7, while being prevented from rotating by engagement with the rectilinear guide cylinder 8.

A focus lens holding member 13 that holds the focus lens 12 is disposed between the anti-vibration base plate 4 and the image pickup device 15. The focus lens 12 and the focus lens holding member 13 are moved in the optical axis direction by the focus drive mechanism 33, whereby a focusing operation is performed. The image pickup device 15 is held by an image pickup device holding member 14.

To increase the photographing magnification, the second lens 1 must be positioned as close to the first lens 5 as possible when the photographing optical system of the lens barrel 23 is at the TELE position (FIG. 3), to thereby increase a moving distance of the second lens 1 in the optical axis direction between the WIDE position (FIG. 4) and the TELE position.

To this end, in the present embodiment, when the photographing optical system of the lens barrel 23 is at the TELE position, a part of the second lens 1 (i.e., a convex spherical surface portion denoted by reference numeral 1a in FIG. 3) intrudes into an aperture of the diaphragm blades 3b of the iris diaphragm 3 disposed between the first lens 5 and the second lens 1, so as to position the second lens 1 as close to the first lens 5 as possible.

In a state shown in FIG. 4 where the photographing optical system of the lens barrel 23 is at the WIDE position, the second lens holding member 2 can be moved by the lens drive mechanism 49 in a diametral direction (i.e., in a direction perpendicular to the optical axis) until a first restricted portion 2c provided in the second lens holding member 2 becomes in diametral contact with a first restricting portion 4c provided in the anti-vibration base plate 4. In other words, a further movement of the second lens holding member 2 is restricted by the engagement between the first restricted portion 2c and the first restricting portion 4c, thereby restricting a maximum amount of movement of the second lens holding member 2 and a maximum amount of movement of the second lens 1 in the direction perpendicular to the optical axis in a state where the photographing optical system is at the WIDE position.

Nevertheless, since the maximum amount of movement of the second lens 1 is relatively large, there is a possibility that the second lens 1 collides with the diaphragm blades 3b when the photographing optical system of the lens barrel 23 is at the TELE position shown in FIG. 3, even if the maximum amount of movement of the second lens 1 is restricted.

To obviate this, in the present embodiment, a second restricting portion 3a is provided in the iris diaphragm 3 as shown in FIGS. 3 and 6, and a second restricted portion 2a is provided in the second lens holding member 2 as shown in FIGS. 3 and 7. When the second lens 1 intrudes into the aperture of the diaphragm blades 3b in a state that the photographing optical system of the lens barrel 23 is at the TELE position shown in FIG. 3, the second restricting portion 3a of the iris diaphragm 3 is disposed on the outer peripheral side of the second restricted portion 2a of the second lens holding member 2.

In that state, if the second lens holding member 2 is moved in the direction perpendicular to the optical axis by vibration, impact, or the like applied to the lens barrel 23, the second restricted portion 2a is brought in diametral contact with the second restricting portion 3a to prevent the second lens 1 from moving. The maximum amount of movement of the second lens 1 restricted by the engagement between the second restricted portion 2a and the second restricting portion 3a is smaller than the maximum amount of movement of the second lens 1 restricted by the first restricted portion 2c and the first restricting portion 4c when the photographing optical system of the lens barrel 23 is at the WIDE position shown in FIG. 4.

An opening and closing range of the diaphragm blades 3b is set in such a manner that the second lens 1 does not interfere with the diaphragm blades 3b, even if the second lens holding member 2 is moved in the direction perpendicular to the optical axis until the second restricted portion 2a becomes in contact with the second restricting portion 3a.

As a result, when the photographing optical system of the lens barrel 23 is at the TELE position shown in FIG. 3, it is possible to prevent the second lens 1 from colliding with the diaphragm blades 3b, even if vibration, impact, or the like is applied in a state where the spherical surface portion 1a of the second lens 1 intrudes into the aperture of the diaphragm blades 3b.

When the photographing optical system of the lens barrel 23 is at the retracted position shown in FIG. 5, the diaphragm 3 is driven by the diaphragm drive mechanism 36 in such a manner that the diameter of the aperture of the diaphragm blades 3b is made larger than that defined when the photographing optical system is at the TELE position, thereby increasing the length of intrusion of the spherical surface portion 1a of the second lens 1 into the aperture. As a result, the distance between the first lens 5 and the second lens 1 is decreased, thereby making it possible to reduce the size of the lens barrel 23 when the photographing optical system is at the retracted position.

When the photographing optical system of the lens barrel 23 is at the retracted position, the second restricting portion 3a of the iris diaphragm 3 is disposed on the outer peripheral side of the second restricted portion 2a of the second lens holding member 2, as with the case where the photographing optical system of the lens barrel 23 is at the TELE position of FIG. 3. Accordingly, if the second lens holding member 2 is moved in the direction perpendicular to the optical axis by vibration, impact, or the like, the second restricted portion 2a becomes in contact with the second restricting portion 3a to thereby prevent the second lens 1 from moving, so that the second lens 1 can be prevented from colliding with the diaphragm blades 3b. The second restricted portion 2a and the second restricting portion 3a are an example of a restriction unit of this invention.

When the power switch button 18 is operated to be turned on by the user, the photographing optical system of the lens barrel 23 moves from the retracted position of FIG. 5 to the WIDE position of FIG. 4. At that time, after the second lens 1 retreats from the aperture of the diaphragm blades 3b, an origin position of the second lens 1 is detected.

It should be noted that the detection accuracy and the camera's optical performance can be improved by detecting the origin position of the second lens 1 by using the first restricting portion 4c and the first restricted portion 2c of the image shake correction mechanism (second lens holding member 2), as compared to a case where the origin position of the second lens 1 is detected by using the second restricting portion 3a (which is separated from the image shake correction mechanism) and the second restricted portion 2a.

It should be noted that although the lens barrel 23 having the iris diaphragm has been described in this embodiment, the present invention is also applicable to a lens barrel having no iris diaphragm. The restriction unit can be provided in e.g. the first lens holding member. In that case, an advantage is achieved that no excessive impact is applied to the image shake correction mechanism.

As described above, in this embodiment, a movement of the second lens holding member 2 in the direction perpendicular to the optical axis is restricted by the engagement either between the first restricted portion 2c of the second lens holding member 2 and the first restricting portion 4c of the anti-vibration base plate 4 or between the second restricted portion 2a of the second lens holding member 2 and the second restricting portion 3a of the iris diaphragm 3 in such a manner that the maximum amount of movement of the second lens 1 (which is an example of an image shake correction lens of this invention) in the direction perpendicular to the optical axis changes according to the position of the photographing optical system in the optical axis direction. As a result, even if the lens barrel 23 has the image shake correction mechanism and the diaphragm mechanism, the distance between lens groups can be decreased, making it possible to reduce the lens barrel size and increase the photographing magnification. It is also possible to avoid a collision between the diaphragm blades 3b and the second lens 1 due to vibration, impact, or the like applied to the lens barrel.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2011-185974, filed Aug. 29, 2011, which is hereby incorporated by reference herein in its entirety.

What is claimed is:

1. A zoom lens barrel comprising:
an image shake correction mechanism having an image shake correction lens that constitutes a part of the photographing optical system and having a lens holding member that is configured to hold the image shake correction lens and movable in a direction perpendicular to the optical axis;
a first restriction unit configured to restrict a first maximum amount of movement of the lens holding member in the direction perpendicular to an optical axis; and
a second restriction unit configured to restrict a second maximum amount of movement of the lens holding member in the direction perpendicular to the optical axis,
wherein the lens holding member is movable between a first zoom position and a second zoom position along the direction of the optical axis,
wherein in a case where the lens holding member is at the first zoom position, the first restriction unit restricts the first maximum amount of movement of the lens holding member in the direction perpendicular to the optical axis,
wherein in a case where the lens holding member is at the second zoom position, the second restriction unit restricts the second maximum amount of movement of the lens holding member in the direction perpendicular to the optical axis, and
wherein the second maximum amount of movement of the lens holding member is smaller than the first maximum amount of movement of the lens holding member.

2. The lens barrel according to claim 1, further including:
a diaphragm mechanism including an iris diaphragm that has diaphragm blades,
wherein the second restriction unit is provided on an image surface side of the iris diaphragm.

3. The lens barrel according to claim 2, wherein the second restriction unit is disposed between the iris diaphragm and the lens holding member, and configured to restrict the second maximum amount of movement of the lens holding member in the direction perpendicular to the optical axis in a state where a part of the image shake correction lens intrudes into an aperture of the diaphragm blades.

4. The lens barrel according to claim 3, wherein the second restriction unit has a second restricting portion provided in the iris diaphragm and a second restricted portion provided in the lens holding member for contact with the restricting portion.

5. The lens barrel according to claim 2, further including:
an anti-vibration base plate disposed on an image surface side of the lens holding member and configured to restrict the first maximum amount of movement of the lens holding member in the direction perpendicular to the optical axis,
wherein the first restriction unit is provided on an object surface side of the anti-vibration base plate.

6. The lens barrel according to claim 2, wherein the lens holding member is movable to a retracted position from the first zoom position or the second zoom position,
wherein a part of the image shake correction lens intrudes into an aperture of the diaphragm blades in a case where the lens holding member is at either of the retracted position and the second zoom position, and
a length of intrusion of the part of the image shake correction lens into the aperture obtained in a case where the lens holding member is at the retracted position is longer than that obtained in a case where the lens holding member is at the second zoom position.

7. The lens barrel according to claim 2, wherein the lens holding member is movable to a retracted position from the first zoom position or the second zoom position,
wherein in a case where the lens holding member moves from the retracted position to the first zoom position, an origin position of the image shake correction lens is detected after the image shake correction lens retreats from an aperture of the diaphragm blades.

8. The lens barrel according to claim 1, wherein the first zoom position is a wide-angle position, and the second zoom position is a telephoto position.

9. An image pickup apparatus comprising:
a body; and
a lens barrel coupled to the body,
wherein the lens barrel comprises:
an image shake correction mechanism having an image shake correction lens that constitutes a part of the photographing optical system and having a lens holding member that is configured to hold the image shake correction lens and movable in a direction perpendicular to the optical axis;
a first restriction unit configured to restrict a first maximum amount of movement of the lens holding member in the direction perpendicular to an optical axis; and
a second restriction unit configured to restrict a second maximum amount of movement of the lens holding member in the direction perpendicular to the optical axis,
wherein the lens holding member is movable between a first zoom position and a second zoom position along the direction of the optical axis,
wherein in a case where the lens holding member is at the first zoom position, the first restriction unit restricts the first maximum amount of movement of the lens holding member in the direction perpendicular to the optical axis,
wherein in a case where the lens holding member is at the second zoom position, the second restriction unit restricts the second maximum amount of movement of the lens holding member in the direction perpendicular to the optical axis, and
wherein the second maximum amount of movement of the lens holding member is smaller than the first maximum amount of movement of the lens holding member.

10. The image pickup apparatus according to claim 9, further including:
a diaphragm mechanism including an iris diaphragm that has diaphragm blades,
wherein the second restriction unit is provided on an image surface side of the iris diaphragm.

11. The image pickup apparatus according to claim 10, wherein the second restriction unit is disposed between the iris diaphragm and the lens holding member, and configured to restrict the second maximum amount of movement of the lens holding member in the direction perpendicular to the optical axis in a state where a part of the image shake correction lens intrudes into an aperture of the diaphragm blades.

12. The image pickup apparatus according to claim 11, wherein the second restriction unit has a second restricting portion provided in the iris diaphragm and a second restricted portion provided in the lens holding member for contact with the restricting portion.

13. The image pickup apparatus according to claim 10, further including:
an anti-vibration base plate disposed on an image surface side of the lens holding member and configured to restrict the first maximum amount of movement of the lens holding member in the direction perpendicular to the optical axis,
wherein the first restriction unit is provided on an object surface side of the anti-vibration base plate.

14. The image pickup apparatus according to claim 10, wherein the lens holding member is movable to a retracted position from the first zoom position or the second zoom position,
wherein a part of the image shake correction lens intrudes into an aperture of the diaphragm blades in a case where the lens holding member is at either of the retracted position and the second zoom position, and
a length of intrusion of the part of the image shake correction lens into the aperture obtained in a case where the lens holding member is at the retracted position is longer than that obtained in a case where the lens holding member is at the second zoom position.

15. The image pickup apparatus according to claim 10, wherein the lens holding member is movable to a retracted position from the first zoom position or the second zoom position,
wherein in a case where the lens holding member moves from the retracted position to the first zoom position, an origin position of the image shake correction lens is detected after the image shake correction lens retreats from an aperture of the diaphragm blades.

16. The image pickup apparatus according to claim 9, wherein the first zoom position is a wide-angle position, and the second zoom position is a telephoto position.

* * * * *